(12) United States Patent
Sieber

(10) Patent No.: US 8,196,306 B2
(45) Date of Patent: Jun. 12, 2012

(54) POST-WELD OFFSET GAGE

(75) Inventor: Kurt Sieber, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 397 days.

(21) Appl. No.: 12/500,289

(22) Filed: Jul. 9, 2009

(65) Prior Publication Data
US 2010/0132482 A1    Jun. 3, 2010

(51) Int. Cl.
*G01B 5/25* (2006.01)
*G01B 3/56* (2006.01)

(52) U.S. Cl. ............... 33/533; 33/535; 33/556

(58) Field of Classification Search ............ 73/535, 73/501.4, 533, 556, 833, 836, 832; 33/535, 33/501.4, 533, 556, 833, 836, 832
See application file for complete search history.

(56) References Cited

U.S. PATENT DOCUMENTS

| | | | |
|---|---|---|---|
| 2,542,030 A | 2/1951 | Hoppe | |
| 3,570,132 A | 3/1971 | Guzzo | |
| 3,911,586 A | 10/1975 | Malonda | |
| 4,894,920 A | 1/1990 | Butler et al. | |
| 5,189,798 A | 3/1993 | La Force | |
| 6,273,320 B1 | 8/2001 | Siebert et al. | |
| 7,328,518 B2 | 2/2008 | Taniuchi et al. | |

OTHER PUBLICATIONS

Dial Type Pit Depth Gauges, Models PG-1200 & PG-1800 by Exacto Machine & Tool, Mechanical Pit Depth Measurement with Ease, Accuracy & Repeatability, webpage, http://www.farwestcorrosion.com/ccpcoatings/exactomachine01.htm.
Pit Gauge Product Series, webpage, http://www.westerninstruments.com/pitgauges.php.

*Primary Examiner* — Lisa Caputo
*Assistant Examiner* — Jonathan Dunlap
(74) *Attorney, Agent, or Firm* — McNees Wallace & Nurick LLC

(57) ABSTRACT

A method and device for analyzing a formed weld of a wind turbine system is disclosed. The device includes a gage for measuring a distance, a first member configured for receiving the gage, a second member attached to the first member, the second member being configured to releasably attach to a first surface on a first side of the formed weld, a third member attached to the first member, the third member being configured to releasably attach to a second surface on a second side of the formed weld, and the gage being positionable at a plurality of locations on the first member, the plurality of locations including a first location being proximal to the second member and distal from the third member and a second location being proximal to the third member and distal from the second member.

20 Claims, 5 Drawing Sheets

POST-WELD OFFSET GAGE

FIELD

The present disclosure generally relates to a device and method for analyzing welds. In particular, the present disclosure relates to a device and method for analyzing off-set or otherwise undesirable welds on wind turbine towers after the welds have been formed.

BACKGROUND

Recently, wind turbines have received increased attention as an environmentally safe and a relatively inexpensive alternative energy source. With this growing interest, considerable efforts have been made to develop wind turbines that are reliable and efficient.

Generally, a wind turbine can include a plurality of blades coupled to a generator rotor through a hub. The generator rotor can be mounted within a housing or nacelle, which may be positioned on top of a tubular tower or a base. The hub and blades may form a wind turbine rotor. Utility grade wind turbines (for example, wind turbines designed to provide electrical power to a utility grid) can have large wind turbine rotors (for example, thirty or more meters in diameter). Blades rotationally coupled on these wind turbine rotors can transform wind energy into a rotational torque or force that drives the rotor of one or more generators.

The tower or the base, or other portions of the wind turbine, can include sections secured to each other by welds. These welds can secure two surfaces together. For example, a cylindrical section may be secured beneath another cylindrical section thereby forming a portion of the tower. The lower section and the upper section may be welded to each other.

The welded parts may be subjected to numerous physical forces. For example, welded tower components may experience cyclically compressive and tensile forces as the wind turbine sways. In addition, physical forces may result from other factors, including but not limited to, environmental effects, operational effects, and/or exposure to changing conditions. If a weld of the welded components is unsuccessful, the parts may be more susceptible to failure. For example, force supplied by wind and/or force supplied by rotation of the blades on a wind turbine can produce fatigue loading on towers in the wind turbine. This fatigue can result in failure of the weld and failure of the wind tower.

Generally, when parts are welded, the method for analyzing whether a weld has the desired mechanical properties is performed during the process of welding or involves complex and/or expensive analytical instruments.

What is needed is a device and method for measuring whether a weld has the desired mechanical properties that can be utilized after the welding process and has reduced expense and/or complexity.

SUMMARY OF THE DISCLOSURE

In an exemplary embodiment, a device for analyzing a formed weld of a wind turbine system includes a gage for measuring a distance, a first member configured for receiving the gage, a second member attached to the first member, the second member being configured to releasably attach to a first surface on a first side of the formed weld, and a third member attached to the first member, the third member being configured to releasably attach to a second surface on a second side of the formed weld. In the embodiment, the gage is positionable at a plurality of locations on the first member, the plurality of locations including a first location being proximal to the second member and distal from the third member and a second location being proximal to the third member and distal from the second member. In addition, the device is configured for determining the quality of the weld by positioning the gage at the plurality of locations and measuring a plurality of dimensions from the first member to each of the first surface and the second surface.

In another exemplary embodiment, a device for analyzing a formed weld of a wind turbine system includes a gage for measuring a distance, a first member configured for receiving the gage, a second member attached to the first member, the second member being configured to releasably attach to a first surface on a first side of the formed weld, and a third member attached to the first member, the third member being configured to releasably attach to a second surface on a second side of the formed weld. In the embodiment, the gage is positionable at a plurality of locations on the first member, the plurality of locations including a first location being proximal to the second member and distal from the third member and a second location being proximal to the third member and distal from the second member, the device is configured for determining the quality of the weld by positioning the gage at the plurality of locations and measuring a plurality of dimensions from the first member to each of the first surface and the second surface, the second member configured to releasably attach to the first surface includes the second member being configured to abut the first surface at a first plurality of locations, the third member configured to releasably attach to the second surface includes the third member being configured to abut the second surface at a second plurality of locations, the device is configured for the gage to be positioned and activated at the first location and the second location, the gage being configured for comparing a first distance from the first member to the first surface at the first location and a second distance from the first member to the second surface at the second location, the device is configured for analyzing the formed weld by being configured to position and activate the gage at a third location, and the device is configured for analyzing the formed weld by being configured to position and activate the gage at a fourth location.

In another exemplary embodiment, a method of analyzing a formed weld of a wind turbine includes providing a device including a gage for measuring a distance, a first member configured for receiving the gage, a second member attached to the first member, the second member being configured to releasably attach to a first surface on a first side of the formed weld, and a third member attached to the first member, the third member being configured to releasably attach to a second surface on a second side of the formed weld. The method also includes positioning and activating the gage at the first location to determine a first distance, the first distance being from the first member to the first surface at the first location, positioning and activating the gage at the second location to determine a second distance, the second location being from the first member to the second surface at the second location, and comparing the first distance to the second distance.

One advantage of the present disclosure includes being able to determine whether a weld is undesirable.

Another advantage of the present disclosure includes being able to confirm a weld includes a desired mechanical property.

Another advantage of the present disclosure includes in-situ analysis of welds on assembled wind turbines in use.

Another advantage of the present disclosure is increased consistency in measurements due to the added stability attributable to only one member touching each surface.

Another advantage of the present disclosure is the ability to measure welds of planar and non-planar geometries.

Another advantage of the present disclosure is the ability to analyze a formed weld with an inexpensive and relatively simple process.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION

Figure 1:
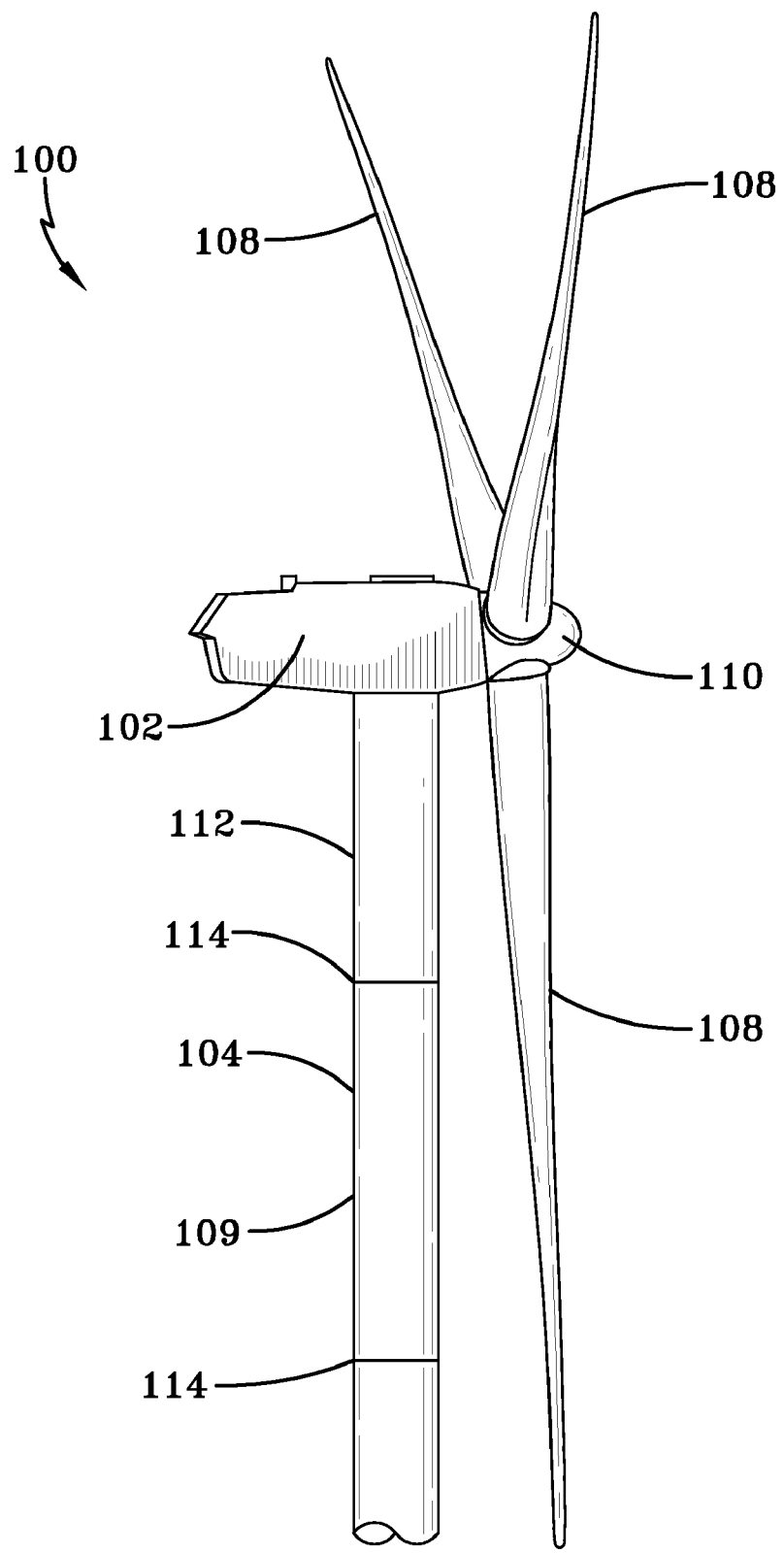
FIG. 1 shows a side view of a wind turbine.

As shown in FIG. 1, a wind turbine system 100 generally comprises a nacelle 102 housing a generator (not shown). Nacelle 102 can be a housing mounted atop a tower 104. Wind turbine system 100 can be installed on various types of terrain providing access to areas having desirable wind conditions. The terrain may vary greatly and may include, but is not limited to, mountainous terrain or off-shore locations. Wind turbine system 100 can also include one or more rotor blades 108 attached to a rotating hub 110. System 100 can include the generator for converting rotation of rotor blades 108 into electrical power.

Tower 104 can include a first portion 109 secured to a second portion 112 by a weld 114. The weld described herein is a formed weld. As used herein, the term "formed weld" includes welds formed through heating, ultrasonic welding, and any other suitable welding process. For example, the formed weld produced by heating may be a cooled weld. As shown, first portion 109 is configured for supporting second portion 112. First portion 109 and second portion 112 can be arcuate, cylindrical or some portion thereof. In one embodiment, first portion 109, second portion 112, and other portions form tower 104 having a conical or frusto-conical geometry. In other embodiments, tower 104 may have other suitable geometries, thereby resulting in surfaces adjacent to weld 114 having different geometries. The geometry of tower 104 forms a plurality of profiles that may include weld 114. For example, in an embodiment with first portion 109 being welded to second portion 112, weld 114 may have a curved profile (see FIGS. 2 and 3). In this embodiment, the adjacent surfaces may be separate substrates. For example, separate substrates may be different materials and/or different pieces. As used herein, the term "adjacent" refers to a proximal or nearby structure. For example, an adjacent surface includes any surface intended to be welded to a surface. In an embodiment with first portion 109 being cylindrical and being welded to form the cylinder geometry, weld 114 may have a substantially planar profile with adjacent surfaces being curved to form a cylinder or a portion of a cylinder (see FIGS. 4 and 5). In this embodiment, the adjacent surfaces may be the same substrate (for example, a metal substrate configured to be formed into a cylinder and welded to itself). In other embodiments, weld 114 may have other profiles formed by other shapes/geometries of the adjacent surfaces.

Figure 2:
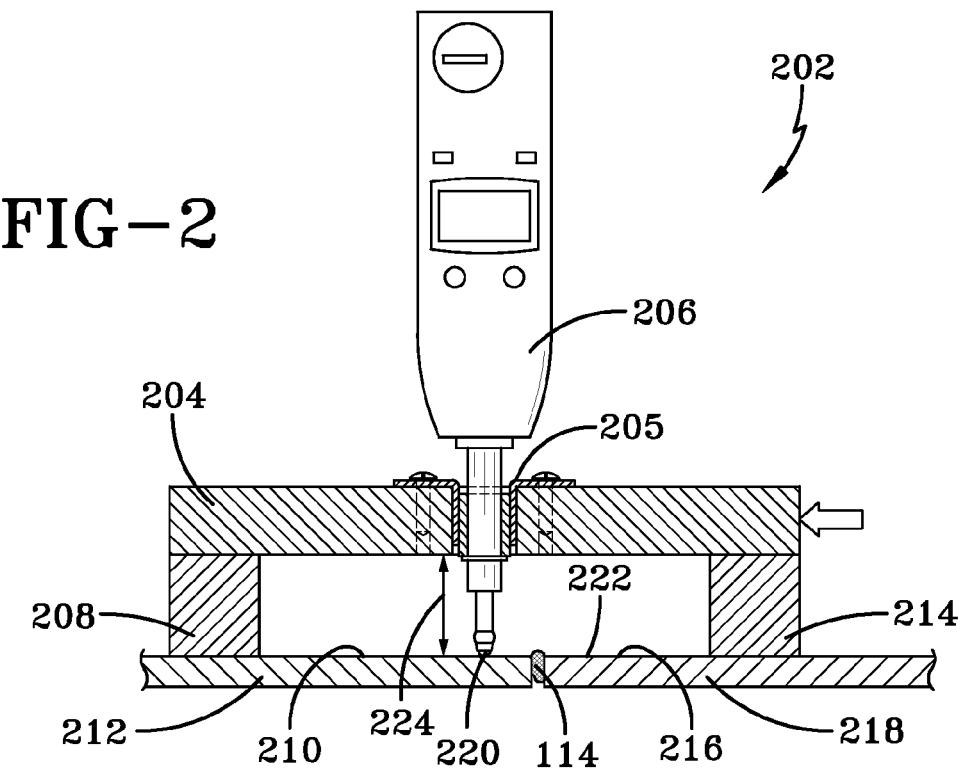
FIG. 2 shows a side view of an exemplary embodiment of a weld analysis device in a first position.

Referring to FIG. 2, a device 202 for analyzing weld 114 is shown. For device 202 to analyze weld 114, weld 114 is preferably formed. Device 202 includes a first member 204 configured for receiving a gage 206. Gage 206 can be a mechanical or electronic device for measuring a distance. For example, gage 206 may be a mechanical or electronic depth measurement device or a pit gage. First member 204 includes a retention feature 205, such as a slot, channel, surface or other structure that adjustably and/or releasably secures gage 206. A second member 208 can be attached or otherwise secured to first member 204. Second member 208 can be releasably secured to a first surface 210 on a first side 212 of weld 114. In one embodiment, second member 208 may be releasably secured by a magnet. Third member 214 can be releasably secured to a second surface 216 on a second side 218 of weld 114. Additionally or alternatively, third member 214 may be releasably secured by a magnet. Second member 208 and/or third member 214 can be secured and/or attached to a metal surface by the magnets. The metal surface may form a portion or all of a structure including, but not limited to, tower 104. In one embodiment, second member 208 and third member 214 are substantially the same. In another embodiment, second member 208 and/or third member 214 may be integrated with first member 204. Limiting device 202 to three members 204, 208, 214 may permit measurements of surfaces with additional profiles. Including greater than three members may result in inconsistent determinations. For example, greater than three members may cause the device to be unstable and/or certain members may be more likely to improperly attach and/or secure to the substrate.

Figure 3:
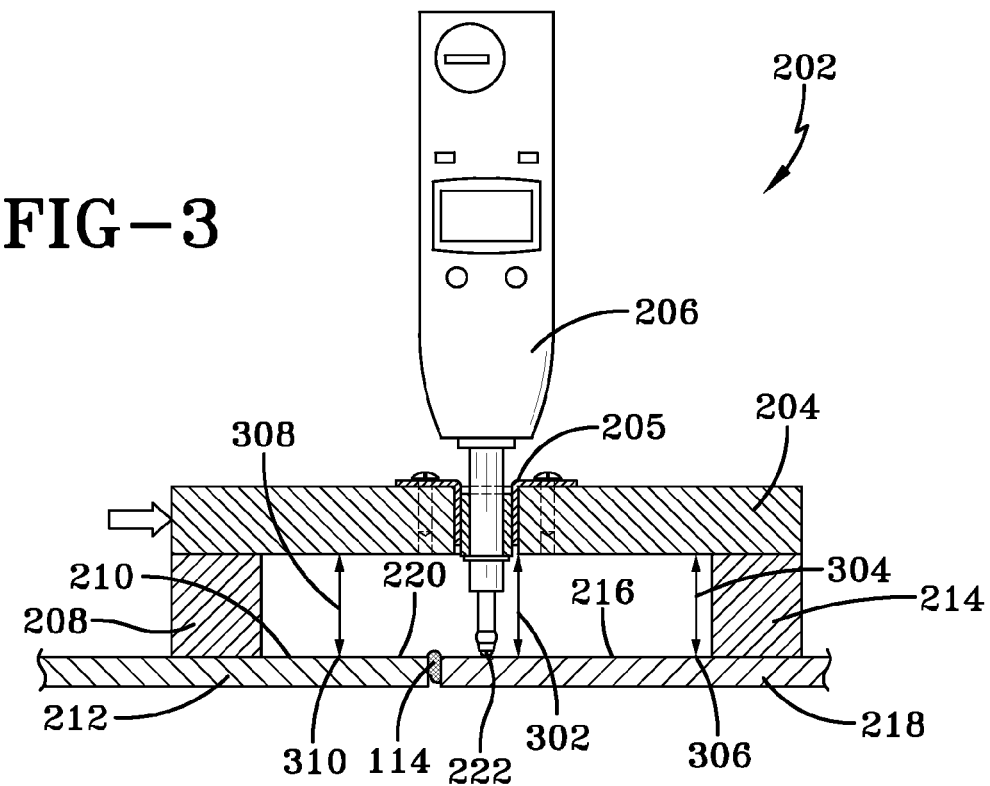
FIG. 3 shows a side view of an exemplary embodiment of a weld analysis device in a second position.

Referring to FIGS. 2 and 3, device 202 is configured for analyzing weld 114 by positioning gage 206 at a plurality of locations along first member 204. In one embodiment, the plurality of locations includes a first location 220 and a second location 222. First location 220 can be proximal to second member 208 and distal from third member 214. Second location 222 can be proximal to third member 214 and distal from second member 208. In one embodiment, second member 208 may be configured to be releasably secured to and/or abut first surface 210 at a plurality of first surface locations. Additionally or alternatively, third member 214 may be configured to be releasably secured to and/or abut second surface 216 at a plurality of second surface locations. Thus, second member 208 and/or third member 216 may be selectively positioned along the surfaces.

By activating gage 206 at positions along first member 204, distances between first member 204 and the surfaces can be measured. In one embodiment, activating gage 206 may be performed by positioning gage 206. In another embodiment, activating gage 206 may be performed by depressing a button on gage 206. A first distance 224 can be measured between first member 204 and first surface 210 at first location 220. A second distance 302 can be measured between first member 204 and second surface 216 at second location 222. As discussed above, first surface 210 and/or second surface 216 may be separate substrates or the same substrate. In one embodiment, a third distance 304 can be measured by activating gage 206 at a third location 306. Third location 304 can be on first surface 210 or second surface 216 but not at first location 220, second location 222, or weld 114. In another embodiment, a fourth distance 308 can be measured by activating gage 206 at a fourth location 310. Fourth location 310 can be on first surface 210 or second surface 216 but not at first location 220, second location 222, third location 306, or weld 114. As will be appreciated, measurements at more locations may permit further analysis of weld 114; however, it is desirable to limit the number of measurements to avoid unnecessary expense and time.

If first surface 210 and second surface 216 are substantially coplanar and weld 114 is intended to join the surfaces thereby forming a generally planar larger surface, then the measurements of first distance 224 in comparison to second distance 302 can indicate whether weld 114 is off-set or otherwise undesirable. As used herein, the term "off-set" or misaligned refers to the relationship between the adjacent edges of two surfaces intended to be coplanar not being coplanar or the relationship between the adjacent edges of two surfaces intended to form a predetermined geometry (for example, a cylinder) not forming the predetermined geometry. If weld 114 is off-set, then first distance 224 and second distance 302 may be different. To confirm that weld 114 is not off-set, first distance 224, second distance 302, and third distance 304 can be compared. If first distance 224, second distance 302, and third distance 304 are all the same and first surface 210 and second surface 216 are substantially planar, then weld 114 is not off-set.

Figure 4:
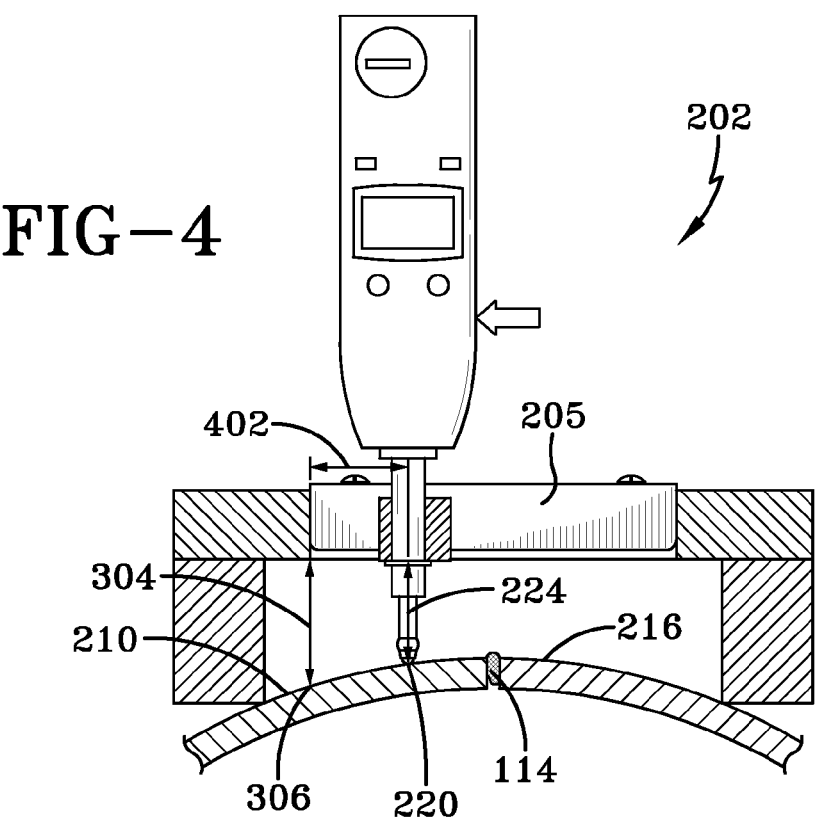
FIG. 4 shows a side view of an exemplary embodiment of a weld analysis device mounted on a cylindrical surface in a first position.
Figure 5:
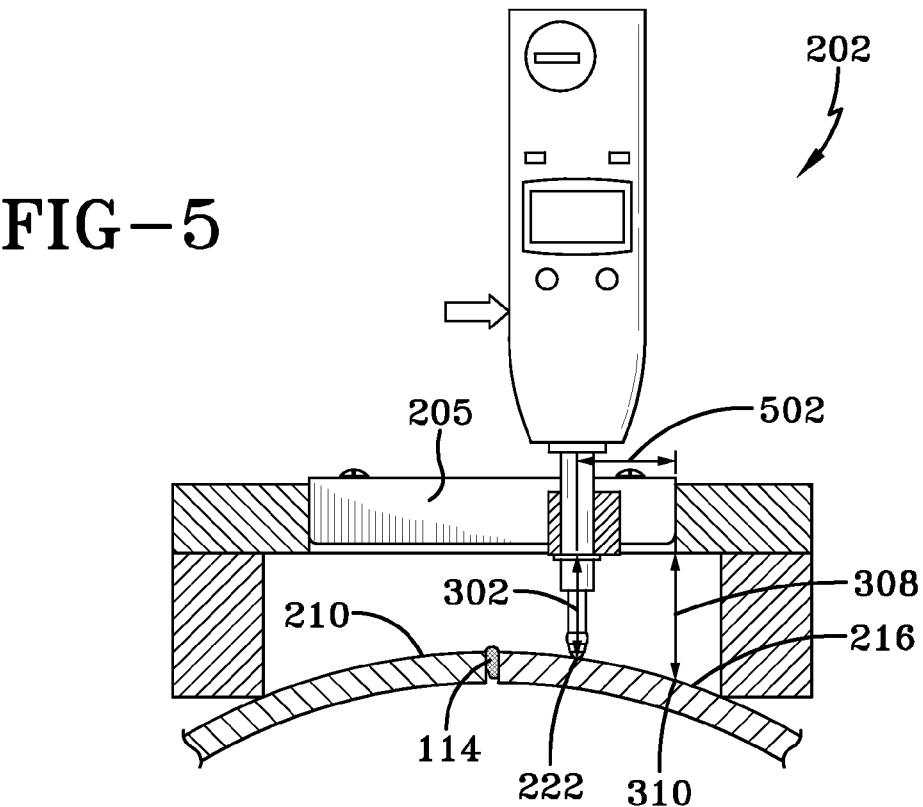
FIG. 5 shows a side view of an exemplary embodiment of a weld analysis device mounted on a cylindrical surface in a second position.

Referring to FIGS. 4 and 5, device 202 can be used for analyzing weld 114 when the adjacent surfaces are not coplanar. In one embodiment, first surface 210 and second surface 216 may be a portion of a cylinder or other curved structure. If first surface 210 and second surface 216 are portions of the cylinder and weld 114 is intended to join the surfaces thereby forming a larger portion of the cylinder (or the entire cylinder), then the measurements of first distance 224 in relation to third distance 304 (third distance 304 being on first surface 210) can be compared to second distance 302 in relation to fourth distance 308 (fourth distance 308 being on second surface 216) to determine whether weld 114 is off-set. To determine whether weld 114 is off-set, a first distance 402 between first location 220 and third location 306 must be determined and a second distance 502 between second location 222 and fourth location 310 must be determined. This information can be compared, recorded, or entered into numerous mathematical calculations indicating whether weld 114 is off-set.

In embodiments with first surface 210 and second surface 216 forming a geometry that is not cylindrical or planar, additional measurements may be performed. The additional measurements may include relative distance of the locations from weld 114, slope of surfaces, and/or thickness of weld 114. In other embodiments, gage 206 for device 202 may calculate whether or not weld 114 is off-set.

Figure 6:
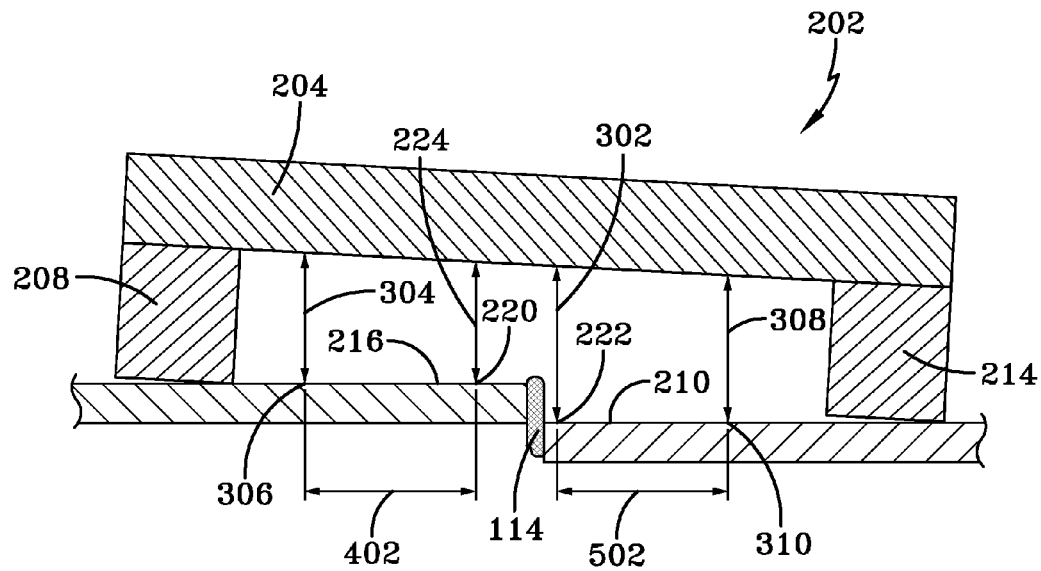
FIG. 6 shows an exaggerated schematic view of an exemplary embodiment of a weld analysis device on what is intended to form a planar surface.

FIG. 6 shows an exaggerated schematic view of an embodiment of device 202 in an exemplary off-set weld 114 with first surface 210 and second surface 216 intended to form a planar larger surface. As shown in FIG. 6, first distance 224, second distance 302, third distance 304, and fourth distance 308 are different. Thus, weld 114 shown in FIG. 6 is off-set.

Figure 7:
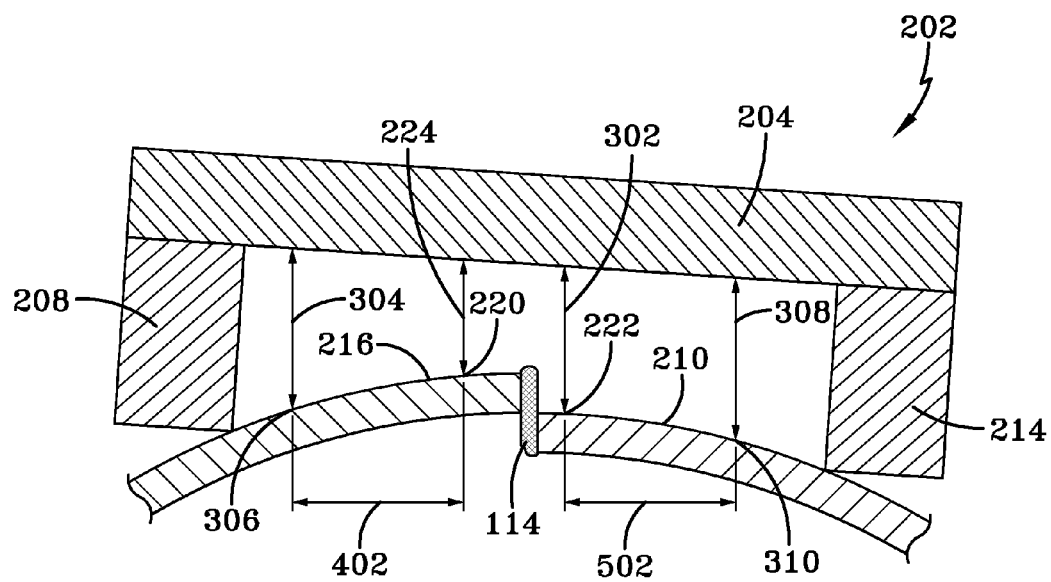
FIG. 7 shows an exaggerated schematic view of an exemplary embodiment of a weld analysis device on what is intended to form a cylindrical surface.

FIG. 7 shows an exaggerated schematic view of an embodiment of device 202 in an exemplary off-set weld 114 with first surface 210 and second surface 216 intended to form a portion of a cylindrical or otherwise curved surface. As shown in FIG. 7, first distance 224, second distance 302, third distance 304, and fourth distance 308 are different. Thus, weld 114 shown in FIG. 7 is off-set.

Figure 8:
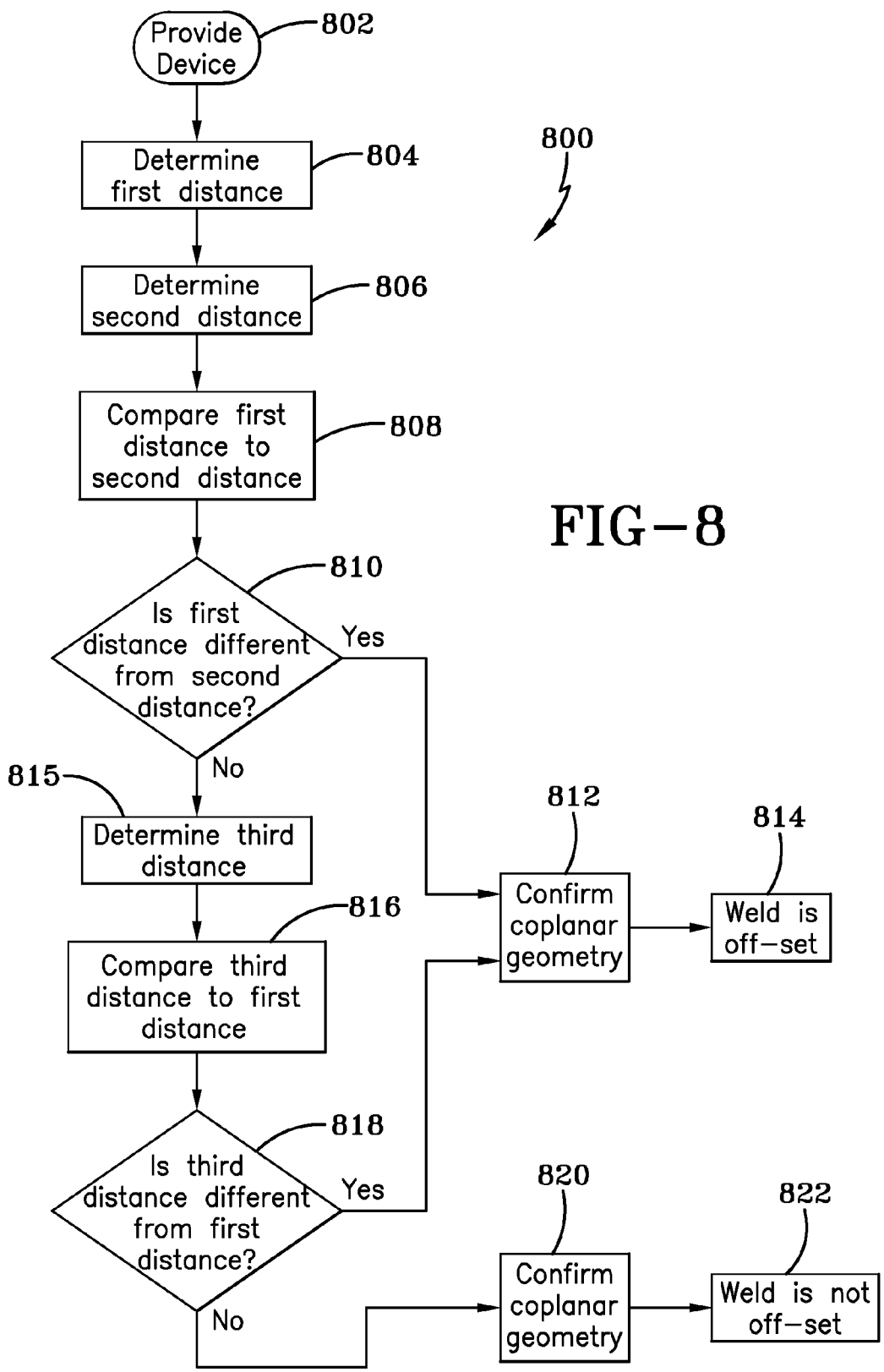
FIG. 8 shows a diagrammatic view of an exemplary embodiment of a weld analysis method.

FIG. 8 shows an exemplary method 800 for analyzing weld 114 to determine whether weld 114 is off-set. Method 800 includes providing device 206 (box 802), positioning and activating gage 206 at first location 220 to determine a first distance (box 804), positioning and activating gage 206 at second location 222 to determine a second distance (box 806), and comparing first distance 224 from first member 204 to first surface 210 at first location 220 to second distance 302 from first member 204 to second surface 216 at second location 222 (box 808). Determining whether first distance 224 is different from second distance 302 (box 810) can permit a determination of whether weld 114 is off-set. If first distance 224 differs from second distance 302 ("Yes" in box 810) and the intended geometry is confirmed as coplanar (box 812), then weld 114 can be considered off-set (box 814).

To confirm that weld 114 is not off-set, depending upon the geometry of the substrate, method 800 may further include positioning and activating gage 206 at third location 306 to determine a third distance 304 (box 815). The third distance 304 is compared to first distance 224 (box 816) in response to first distance 224 being equal to second distance 302 ("No" in box 810). Determining whether first distance 224 is different from third distance 304 (box 818) can permit a determination of whether weld 114 is off-set. If first distance 224 differs from third distance 304 ("Yes" in box 818) and the intended geometry is confirmed as coplanar (box 812), then weld 114 can be considered off-set (box 814). If first distance 224 equals third distance 304 ("No" in box 818) and the intended geometry is confirmed as coplanar (box 820), then weld 114 can be considered not off-set (box 822). In other embodiments, additional geometries (for example, arcuate or cylindrical geometries) can permit a determination of whether weld 114 is off-set by positioning and activating gage 206 at fourth location 310 to determine a fourth distance 308, recording first distance 224, second distance 302, third distance 304, and/or fourth distance 308, and/or recording the relative position between at least the locations. The determination of whether additional measurements are desired is based upon mathematic/geometric relationships between the geometry intended to be formed by first surface 210, second surface 216, and weld 114. For tower 104 in wind turbine 100, a specified geometry based upon a design model can be determined that permits measurements to be taken of the surfaces thereby permitting periodic confirmation that welds 114 are not off-set.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A device for analyzing a formed weld of a wind turbine system, comprising:

a gage for measuring a distance on a wind turbine tower;

a first member configured for receiving the gage, the first member having a retention feature;

a second member fixedly attached to the first member, the second member being configured to releasably attach to a first surface of the wind turbine tower on a first side of the formed weld;

a third member fixedly attached to the first member, the third member being configured to releasably attach to a second surface of the wind turbine tower on a second side of the formed weld;

the gage being positionable at a plurality of locations along the retention feature on the first member, the plurality of locations including a first location being proximal to the second member and distal from the third member and a second location being proximal to the third member and distal from the second member; and, the device being configured for determining the quality of the weld by positioning the gage at the plurality of locations and measuring a plurality of dimensions from the first member to each of the first surface and the second surface.

2. The device of claim 1, wherein the second member and the third member are substantially the same.

3. The device of claim 1, wherein each of the second member and the third member comprise at least one magnet, the magnet being attachable to one or both of the first surface and the second surface.

4. The device of claim 1, wherein the second member being configured to releasably attach to the first surface includes the second member being configured to abut the first surface at a first plurality of locations.

5. The device of claim 4, wherein the third member being configured to releasably attach to the second surface includes the third member being configured to abut the second surface at a second plurality of locations.

6. The device of claim 1, wherein no more than one of the second member and the third member is releasably attached to the first surface.

7. The device of claim 1, wherein the device is configured for the gage to be positioned and activated at the first location and the second location, the gage being configured for comparing a first distance from the first member to the first surface at the first location and a second distance from the first member to the second surface at the second location.

8. The device of claim 7, wherein the device is configured for analyzing the formed weld by being configured to position and activate the gage at a third location.

9. The device of claim 8, wherein the device is configured for analyzing the formed weld by being configured to position and activate the gage at a fourth location.

10. The device of claim 1, wherein a first substrate comprises the first surface and a second substrate comprises the second surface.

11. The device of claim 1, wherein a first substrate comprises the first surface and the second surface.

12. The device of claim 11, wherein the first substrate and the formed weld generally form a cylinder.

13. The device of claim 12, wherein the cylinder forms a portion of a tower for the wind turbine system.

14. A device for analyzing a formed weld of a wind turbine system, comprising:
a gage for measuring a distance on a wind turbine tower;
a first member configured for receiving the gage, the first member having a retention feature;
a second member fixedly attached to the first member, the second member being configured to releasably attach to a first surface of the wind turbine tower on a first side of the formed weld; and a third member fixedly attached to the first member, the third member being configured to releasably attach to a second surface of the wind turbine tower on a second side of the formed weld; and, the gage being positionable at a plurality of locations along the retention feature on the first member, the plurality of locations including a first location being proximal to the second member and distal from the third member and a second location being proximal to the third member and distal from the second member; and, the device being configured for determining the quality of the weld by positioning the gage at the plurality of locations and measuring a plurality of dimensions from the first member to each of the first surface and the second surface, the second member being configured to releasably attach to the first surface includes the second member being configured to abut the first surface at a first plurality of locations, the third member being configured to releasably attach to the second surface includes the third member being configured to abut the second surface at a second plurality of locations, the device being configured for the gage to be positioned and activated at the first location and the second location, the gage being configured for comparing a first distance from the first member to the first surface at the first location and a second distance from the first member to the second surface at the second location, the device being configured for analyzing the formed weld by being configured to position and activate the gage at a third location, and the device being configured for analyzing the formed weld by being configured to position and activate the gage at a fourth location.

15. A method of analyzing a formed weld of a wind turbine, comprising:
providing a device comprising:
a gage for measuring a distance;
a first member configured for receiving the gage;
a second member attached to the first member, the second member being configured to releasably attach to a first surface on a first side of the formed weld;
a third member attached to the first member, the third member being configured to releasably attach to a second surface on a second side of the formed weld;
the gage being positionable at a plurality of locations on the first member, the plurality of locations including a first location being proximal to the second member and distal from the third member and a second location being proximal to the third member and distal from the second member; and,
the device being configured for determining the quality of the weld by positioning the gage at the plurality of locations and measuring a plurality of dimensions from the first member to each of the first surface and the second surface;
positioning and activating the gage at the first location to determine a first distance, the first distance being from the first member to the first surface at the first location;
positioning and activating the gage at the second location to determine a second distance, the second location being from the first member to the second surface at the second location;
comparing the first distance to the second distance; and, determining whether the weld is off set.

16. The method of claim 15, further comprising positioning and activating the gage at a third location to analyze the formed weld, the third location being on the first surface or the second surface.

17. The method of claim 16, further comprising positioning and activating the gage at a fourth location to analyze the formed weld, the fourth location being on the first surface or the second surface, the third location and the fourth location being on different surfaces.

18. The method of claim 16, further comprising recording at least the first distance, the second distance, and the third distance.

19. The method of claim 16, further comprising recording a relative position between at least the first distance, the second distance, and the third distance.

20. The method of claim 16, wherein determining whether the weld is off set includes confirming coplanar geometry.

* * * * *